US011315165B2

(12) United States Patent
Korpeoglu et al.

(10) Patent No.: US 11,315,165 B2
(45) Date of Patent: Apr. 26, 2022

(54) ROUTINE ITEM RECOMMENDATIONS (71) Applicant: Walmart Apollo, LLC, Bentonville, AR (US)

(72) Inventors: Evren Korpeoglu, San Jose, CA (US); Sushant Kumar, Sunnyvale, CA (US); Divya Chaganti, Dublin, CA (US); Jiwen You, Sunnyvale, CA (US); Kannan Achan, Saratoga, CA (US); Niousha Bolandzadeh Fasaie, Campbell, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/776,176

(22) Filed: Jan. 29, 2020

(65) Prior Publication Data
US 2021/0233149 A1    Jul. 29, 2021

(51) Int. Cl.
*G06Q 30/00* (2012.01)
*G06Q 30/06* (2012.01)
*G06F 16/9535* (2019.01)
*G06Q 30/02* (2012.01)
*G06F 16/903* (2019.01)

(52) U.S. Cl.
CPC ... *G06Q 30/0631* (2013.01); *G06F 16/90335* (2019.01); *G06F 16/9535* (2019.01); *G06Q 30/0253* (2013.01); *G06Q 30/0255* (2013.01); *G06Q 30/0633* (2013.01); *G06Q 30/0641* (2013.01)

(58) Field of Classification Search
CPC .................................................... G06Q 30/00
See application file for complete search history.

(56) References Cited

U.S. PATENT DOCUMENTS

| 7,676,400 | B1 | 3/2010 | Dillon |
| 7,698,170 | B1 | 4/2010 | Darr et al. |
| 7,720,723 | B2 | 5/2010 | Dicker et al. |
| 7,983,952 | B1 | 7/2011 | Dillon |
| 8,781,916 | B1 * | 7/2014 | Buryak ............... G06Q 30/0631 705/26.7 |
| 8,799,096 | B1 | 8/2014 | Dillon |

(Continued)

OTHER PUBLICATIONS

Joshi, Prateek, "Building a recommendation system using Word2vbec: A unique tutorial with case study python", Analytics Vidhya, dated Jul. 30, 2019. (Year: 2019).*

(Continued)

*Primary Examiner* — Mark A Fadok
(74) *Attorney, Agent, or Firm* — Duane Morris LLP; Manita Rawat (57) ABSTRACT

An approach is disclosed for recommending complementary items based on customer shopping routines. The approach receives anchor item data. The approach identifies a routine that corresponds to the anchor item data. The routine is based on an item purchasing behavior of a customer. The approach determines categorical data within the identified routine by applying a ranking algorithm to the categorical data of the categories and the anchor item data. The categorical data is relevant to the anchor item data. The approach generates relevant item data from the categorical data by applying an item recommendation model to item data that corresponds to the categorical data.

16 Claims, 8 Drawing Sheets

(56) References Cited

U.S. PATENT DOCUMENTS

| | | | |
|---|---|---|---|
| 9,483,547 B1* | 11/2016 | Feller | G06F 16/287 |
| 9,691,096 B1 | 6/2017 | Dai | |
| 9,760,802 B2 | 9/2017 | Chen et al. | |
| 9,818,145 B1 | 11/2017 | Finkelstein et al. | |
| 9,852,193 B2 | 12/2017 | Chen et al. | |
| 9,959,563 B1 | 5/2018 | Wu et al. | |
| 10,055,778 B1 | 8/2018 | Dillon | |
| 10,115,146 B1* | 10/2018 | Anderson | G06Q 30/0631 |
| 10,740,825 B1* | 8/2020 | Zhang | G06F 16/24575 |
| 10,891,673 B1* | 1/2021 | Sawaf | G06F 16/248 |
| 11,195,112 B2* | 12/2021 | Chee | G06N 5/02 |
| 2002/0010625 A1 | 1/2002 | Smith et al. | |
| 2005/0102202 A1 | 5/2005 | Linden et al. | |
| 2006/0020614 A1* | 1/2006 | Kolawa | G06Q 30/02 |
| 2009/0099920 A1 | 4/2009 | Aharoni et al. | |
| 2009/0234712 A1* | 9/2009 | Kolawa | G06Q 30/02 705/14.4 |
| 2010/0191582 A1 | 7/2010 | Dicker et al. | |
| 2010/0191619 A1 | 7/2010 | Dicker et al. | |
| 2010/0268661 A1 | 10/2010 | Levy et al. | |
| 2011/0082728 A1 | 4/2011 | Melikian | |
| 2011/0238525 A1 | 9/2011 | Linden et al. | |
| 2011/0302155 A1 | 12/2011 | Yan et al. | |
| 2012/0158552 A1 | 6/2012 | Smith | |
| 2012/0259729 A1 | 10/2012 | Linden et al. | |
| 2013/0097052 A1 | 4/2013 | Dicker et al. | |
| 2013/0198030 A1 | 8/2013 | Linden et al. | |
| 2013/0290110 A1 | 10/2013 | LuVogt et al. | |
| 2013/0290339 A1 | 10/2013 | LuVogt et al. | |
| 2013/0290905 A1 | 10/2013 | LuVogt et al. | |
| 2013/0346234 A1 | 12/2013 | Hendrick et al. | |
| 2014/0067597 A1 | 3/2014 | Kirkby et al. | |
| 2014/0074649 A1* | 3/2014 | Patel | G06Q 30/0631 705/26.7 |
| 2014/0304032 A1 | 10/2014 | Mitchell et al. | |
| 2015/0012345 A1 | 1/2015 | Bhagat et al. | |
| 2015/0073931 A1 | 3/2015 | Ronen et al. | |
| 2016/0005097 A1 | 1/2016 | Hsiao et al. | |
| 2016/0048902 A1 | 2/2016 | Ward et al. | |
| 2016/0188725 A1 | 6/2016 | Wang et al. | |
| 2016/0189257 A1 | 6/2016 | Dicker et al. | |
| 2017/0083965 A1 | 3/2017 | Sun | |
| 2017/0090867 A1 | 3/2017 | Lifar et al. | |
| 2018/0060696 A1* | 3/2018 | Chen | G06K 9/6226 |
| 2018/0336241 A1* | 11/2018 | Noh | G06N 20/00 |
| 2019/0163758 A1 | 5/2019 | Zhivotvorev et al. | |
| 2019/0164069 A1 | 5/2019 | Zhivotvorev et al. | |
| 2019/0197400 A1* | 6/2019 | Zhang | G06N 3/084 |
| 2019/0370879 A1* | 12/2019 | Bhattacharjee | G06N 3/0454 |
| 2020/0372073 A1* | 11/2020 | Dahl | G06F 16/168 |

OTHER PUBLICATIONS

Iqbal, Murium, "A Multimodal Recommender System for Large-scale Assortment Generation in E-commerce", ACM SIGAR Workshop on ecommerce, dated Jun. 28, 2018 (Year: 2018).*

Yanh, Xiwaang, "A survey of collaborative filtering based on social recommendation systems", Computer Communications, dated Jul. 22, 2012. (Year: 2012).*

MasterCard launches MasterCard[R] priceless gift finder[TM] to help online shoppers find the perfect gift this holiday season. (Nov. 16, 2009). Business Wire Retrieved from https://dialog.proquest.com/professional/docview/1074708312?accountid= 161862 (Year: 2009).

M. R. Azodinia and A. Hajdu, "A recommender system that deals with items having an image as well as quantitative features," 2015 IEEE 9th International Symposium on Intelligent Signal Processing (WISP) Proceedings, 2015, pp. 1-6, doi: 10.1109/WISP.2015.7139167. (Year: 2015).

* cited by examiner

| ANCHOR ITEM: NUTRITIVE SOLUTIONS DAILY MOISTURE SHAMPOO | | | | | |
|---|---|---|---|---|---|
| ROUTINE: COMPLETE YOUR SHOWERING ROUTINE ESSENTIALS | | | | | |
| CATEGORY: SHAMPOOS | | | | | |
| RANKED TOP ROUTINE CATEGORIES: | | | | | |
| RANK: | CATEGORY: | $\rho c^{(i,j)}$ | $\rho i^{(m,j)}$ | Wc | $\rho^{(m,j)}$ |
| 1 | CONDITIONERS | 0.959 | 0.893 | 0.5 | 0.926 |
| 2 | SHOWER GELS | 0.751 | 0.796 | 0.5 | 0.774 |
| 3 | FACE WASH | 0.704 | 0.758 | 0.5 | 0.731 |
| 4 | SCALP SCRUB | 0.680 | 0.771 | 0.5 | 0.726 |
| 5 | HAIR SETS | 0.665 | 0.558 | 0.5 | 0.626 |

| ANCHOR ITEM: COOL WAVE MEN'S ANTIPERSPIRANT AND DEODORANT | | | | | |
|---|---|---|---|---|---|
| ROUTINE: COMPLETE YOUR SHOWERING ROUTINE ESSENTIALS | | | | | |
| CATEGORY: DEODORANTS AND ANTIPERSPIRANTS | | | | | |
| RANKED TOP ROUTINE CATEGORIES: | | | | | |
| RANK: | CATEGORY: | $\rho c^{(i,j)}$ | $\rho i^{(m,j)}$ | Wc | $\rho^{(m,j)}$ |
| 1 | SHOWER GELS | 0.823 | 0.745 | 0.5 | 0.784 |
| 2 | SHAMPOOS | 0.665 | 0.668 | 0.5 | 0.666 |
| 3 | HAIR SETS | 0.632 | 0.549 | 0.5 | 0.590 |
| 4 | STYLING AND TREATMENTS | 0.504 | 0.512 | 0.5 | 0.508 |
| 5 | CONDITIONERS | 0.546 | 0.463 | 0.5 | 0.504 |

FIG. 5B

| 502 — Anchor Item: | NUTRITIVE SOLUTIONS DAILY MOISTURE SHAMPOO | | | | |
|---|---|---|---|---|---|
| 506 — Category: | Shampoos | | | | |
| 404 — Routine: | complete your showering routine essentials | | | | |

| Routine Category Rank | Category | Complementary Item | Complementary Score | Source | Item Rank |
|---|---|---|---|---|---|
| 1 | Conditioners | Nutritive Solutions Daily Moisture Conditioner 602 | 0.87 | BAB | 1 |
| | Conditioners | Nourishing Rituals Cool Moisture Conditioner 604 | 0.74 | BAB | 2 |
| | Conditioners | Intense Damage Therapy Conditioner for Accumulated Damage 606 | 0.57 | SFM | 3 |
| 2 | Shower gels | Sensitive Skin Shower Foam 608 | 0.66 | BAB | 1 |
| | Shower gels | Go Fresh Body Wash, Cool Moisture, Cucumber & Green Tea 610 | 0.89 | SFM | 2 |
| | Shower gels | Deep Moisture Body Wash Pump 612 | 0.45 | SFM | 3 |
| 3 | Face wash | Gentle Skin Cleanser, Face Wash for Sensitive and All Skin Types 614 | 0.69 | BAB | 1 |
| | Face wash | Bright Reveal Facial Cleanser w/ Glycolic Acid 616 | 0.66 | SFM | 2 |
| | Face wash | Oil-Free Pink Grapefruit Acne Facial Cleanser 618 | 0.8 | Trending | 3 |
| 4 | Scalp scrub | Sugar Shine Polishing Hair Scrub by Matrix for Unisex 620 | 0.89 | BAB | 1 |
| | Scalp scrub | Super Strength Leave-In Conditioning 622 | 0.73 | BAB | 2 |
| | Scalp scrub | Eczema & Psoriasis 624 | 0.61 | BAB | 3 |

Arrows point to rows: 510 → row 1, 512 → row 2, 514 → row 3, 516 → row 4.

ROUTINE ITEM RECOMMENDATIONS

TECHNICAL FIELD

The disclosure relates generally to recommending items, and more particularly, for recommending complementary items based on customer shopping routines.

BACKGROUND

When a customer purchases an item on an e-commerce website, the customer may select and add the item to an online shopping cart. The e-commerce website may display the item (i.e., an anchor item) on, for example, an add-to-cart page (i.e., the online shopping cart), and recommend items that complement the anchor item. Typically, complementary items may include items that other customers purchased along with purchasing the anchor item.

Conventional item recommendation models may utilize co-purchase data of the anchor item to determine which complementary items to recommend and display to a customer. The co-purchase data may include a history of complementary items that other customers purchased when purchasing the anchor item. That is, the conventional item recommendation model may be an item-to-item co-purchase model, and as such, may only provide coverage for a small portion of the items listed for sale. For example, an e-commerce website may offer about eighty million items for sale. However, customers may purchase the same complementary items for an anchor item, thereby creating co-purchase data for these complementary items and none for other complementary items. Thus, out of the eighty million items, the item recommendation model may recommend only a small portion of the eighty million items for sale.

Moreover, conventional item recommendation models may provide a list of complementary items to the anchor item; however, these complementary items are typically from one shopping category of products. For example, if a customer adds shampoo to the online shopping cart, the conventional item recommendation model may only recommend conditioners as complementary items, and may not recommend items from other categories, such as, for example, body wash or face wash. As such, these models may not provide a comprehensive list of complementary items from a variety of categories. Therefore, these models may not provide a customer with a variety of items to complete a customer's shopping routine. Additionally, by not providing the customer with a variety of complementary items in a singular location, the customer may have to search through various web pages of the e-commerce website to locate the items to complete the shopping routine, and may forget or not be able to find items to complete the shopping routine.

SUMMARY

The summary of the disclosure is given to aid understanding of providing item recommendations based on customer shopping routines and not with an intent to limit the disclosure. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the systems, devices, and their methods of operation to achieve different effects. Certain aspects of the present disclosure provide a system, method, and non-transitory computer readable medium for recommending items based on customer shopping routines.

The embodiments described herein are directed to a means of providing item recommendations based on a customer's shopping routine. The embodiments may identify a customer's shopping routines by leveraging a customer's purchase history data and corresponding metadata of the purchased items to generate categories for the items. The embodiments may cluster groups of categories that have complementary behavior, in which a cluster of categories may create a routine. When an anchor item is received that corresponds to a routine, the embodiments provide item recommendations based on the routine. As such, the embodiments described herein may improve customer shopping experience by providing item recommendations from a variety of categories that are relevant to the anchor item. Moreover, the embodiments described herein may provide recommended items to complete the customer's shopping routine on one page of an e-commerce website.

In one or more aspects, the disclosed technology relates to a system that comprises a memory having instructions stored thereon, and a processor configured to read the instructions. In one or more cases, the processor is configured to read the instructions to receive anchor item data. In one or more cases, the processor is configured to read the instructions to identify a routine that corresponds to the anchor item data. In one or more cases, the routine is based on an item purchasing behavior of a customer. In one or more cases, the processor is configured to read the instructions to determine categorical data within the identified routine by applying a ranking algorithm to the categorical data of the categories and the anchor item data. In one or more cases, the categorical data is relevant to the anchor item data. In one or more cases, the processor is configured to read the instructions to generate relevant item data from the categorical data by applying an item recommendation model to item data that corresponds to the categorical data.

In one or more other aspects, the disclosed technology relates to a method. In one or more cases, the method comprises receiving anchor item data. In one or more cases, the method comprises identifying a routine that corresponds to the anchor item data. In one or more cases, the routine is based on an item purchasing behavior of a customer. In one or more cases, the method comprises determining categorical data within the identified routine by applying a ranking algorithm to the categorical data of the categories and the anchor item data. In one or more cases, the categorical data is relevant to the anchor item data. In one or more cases, the method comprises generating relevant item data from the categorical data by applying an item recommendation model to item data that corresponds to the categorical data.

In yet one or more other aspects, the disclosed technology relates to a computer program product. In one or more cases, the computer program product comprises a non-transitory computer readable medium having program instructions stored thereon. In one or more cases, the program instructions may be executable by one or more processors. In one or more cases, the program instructions comprise receiving anchor item data. In one or more cases, the program instructions comprise identifying a routine that corresponds to the anchor item data. In one or more cases, the routine is based on an item purchasing behavior of a customer. In one or more cases, the program instructions comprise determining categorical data within the identified routine by applying a ranking algorithm to the categorical data of the categories and the anchor item data. In one or more cases, the categorical data is relevant to the anchor item data. In one or more cases, the program instructions comprise generating relevant item data from the categorical data by applying an item recommendation model to item data that corresponds to the categorical data.

BRIEF DESCRIPTION OF THE DRAWINGS

The features and advantages of the present disclosure will be better understood when read in conjunction with the figures provided. Embodiments are provided in the figures for the purpose of illustrating aspects, and/or features, of the various embodiments, but the claims should not be limited to the precise arrangements, structures, features, aspects, methods, processes, assemblies, systems, or devices shown, and the arrangements, structures, features, aspects, methods, processes, assemblies, systems, and devices shown may be used singularly or in combination with other arrangements, structures, features, aspects, methods, processes, assemblies, systems, and devices.

DETAILED DESCRIPTION

The following discussion omits or only briefly describes conventional features of the data processing environment, which are apparent to those skilled in the art. It is noted that various embodiments are described in detail with reference to the drawings, in which like reference numerals represent like drawing elements throughout the figures. Reference to various embodiments does not limit the scope of the claims attached hereto. Additionally, any examples set forth in this specification are intended to be non-limiting and merely set forth some of the many possible embodiments for the appended claims. Further, particular features described herein can be used in combination with other described features in each of the various possible combinations and permutations. The objectives and advantages of the claimed subject matter will become more apparent from the following detailed description of these embodiments in connection with the accompanying drawings.

Unless otherwise specifically defined herein, all terms are to be given their broadest possible interpretation including meanings implied from the specification as well as meanings understood by those skilled in the art and/or as defined in dictionaries, treatises, etc. It is also noted that, as used in the specification and the appended claims, the singular forms "a," "an," and "the" include plural referents unless otherwise specified, and that the terms "comprises" and/or "comprising," when used in this specification, specify the presence or addition of one or more other features, aspects, steps, operations, elements, components, and/or groups thereof. Moreover, the terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Embodiments of the disclosure relate generally to recommending items, and more particularly, to recommending complementary items based on customer shopping routines. Embodiments that provide complementary items based on routines are described below with reference to the figures.

Figure 1:
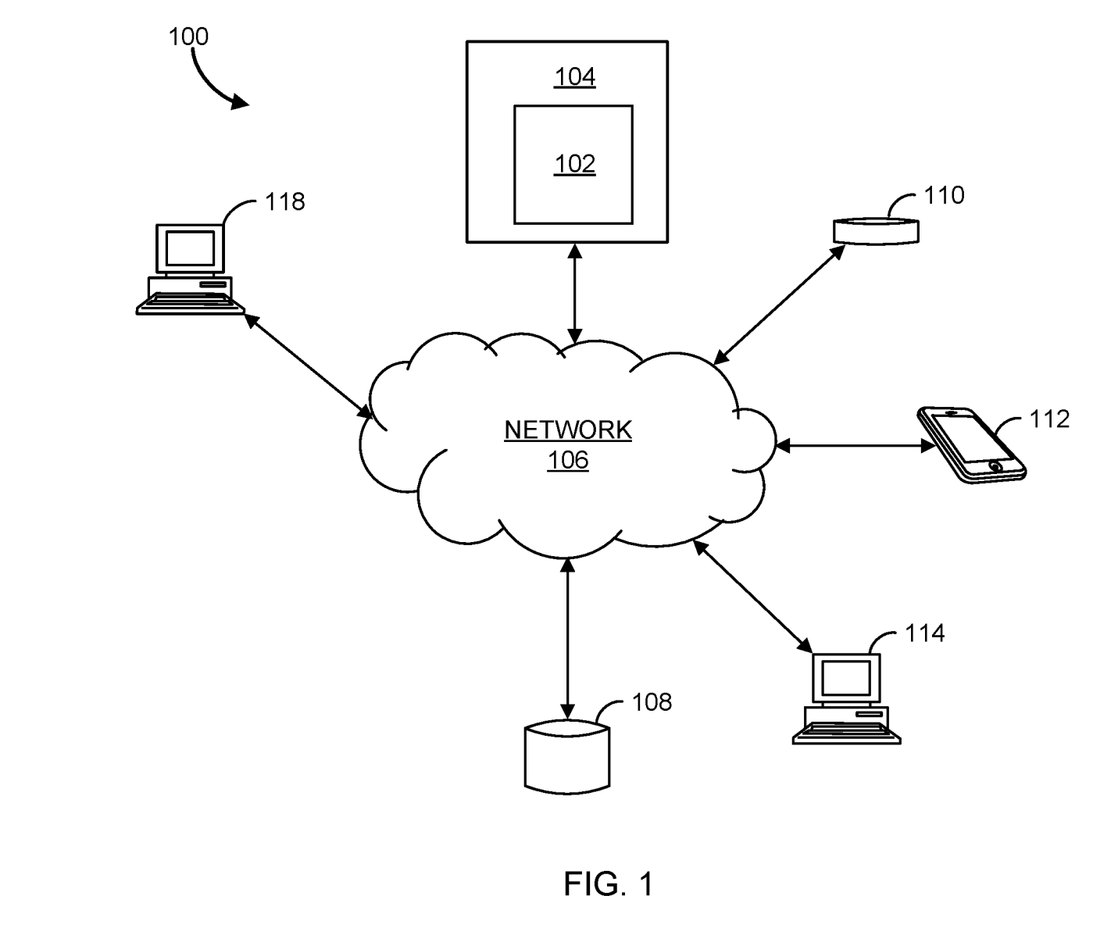
FIG. 1 is a functional block diagram of a data processing environment, in accordance with one or more embodiments.

FIG. 1 is a functional block diagram of a data processing environment 100. FIG. 1 provides only an illustration of one implementation and does not imply any limitations with regard to the environments in which different embodiments may be implemented. Many modifications of the depicted environment may be made by those skilled in the art without departing from the scope of the claims. In one or more cases, the data processing environment 100 includes a server 104, which operates a complementary recommendation system 102 (hereinafter "system 102"), a data storage repository 108, and one or more computing devices, such as computing device 118 and customer devices 110, 112, and 114 coupled over a network 106. The server 104, system 102, data storage repository 108, and devices 110, 112, 114, and 118 can each be any suitable computing device that includes any hardware or hardware and software combination for processing and handling information, and transmitting and receiving data among the server 104, system 102, data storage repository 108, and devices 110, 112, 114, and 118.

The server 104, system 102, data storage repository 108, and devices 110, 112, 114, and 118 can each include one or more processors, one or more field-programmable gate arrays (FPGAs), one or more application-specific integrated circuits (ASICs), one or more state machines, digital circuitry, or any other suitable circuitry.

The network 106 interconnects the server 104, the data storage repository 108, and one or more of the devices 110, 112, and 114. In general, the network 106 can be any combination of connections and protocols capable of supporting communication between the server 104, the data storage repository 108, one or more of the computing devices 110, 112, 114, and 118, and the system 102. For example, the network 106 may be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. In one or more cases, the network 106 may include wire cables, wireless communication links, fiber optic cables, routers, switches, firewalls, or any combination that can include wired, wireless, or fiber optic connections known by those skilled in the art.

In one or more cases, the server 104 hosts the system 102. In some cases, the server 104 may be a web server, a blade server, a mobile computing device, a laptop computer, a tablet computer, a netbook computer, a personal computer (PC), a desktop computer, or any programmable electronic device or computing system capable of receiving and sending data, via the network 106, and performing computer-readable program instructions. For example, for the cases in which the server 104 is a web server, the server 104 may host one or more pages of a website. Each of the computing devices 110, 112, 114, and 118 may be operable to view, access, and interact with the web pages hosted by the server 104. In one or more examples, the server 104 hosts a website, such as an e-commerce website, for a retailer to sell items and for a customer to purchase an item via one or more web pages. For example, a user of a computing device, such as the computing device 110, 112, or 114, may access a web page, add one or more items to an online shopping cart, and perform an online checkout of the shopping cart to purchase the items. In another example, a user of the computing device 118 may access one or more aspects of the system 102, for instance, to upload an item to the e-commerce website. In other cases, the server 104 can be a data center, which includes a collection of networks and servers, such as virtual servers and applications deployed on virtual servers, providing an external party access to the system 102. In some other cases, the server 104 represents a computing system utilizing clustered computers and components (e.g., database server computer, application server computers, etc.) that act as a single pool of seamless resources, such as in a cloud computing environment, when accessed within data processing environment 100.

In one or more cases, the data storage repository 108 may store data including, but not limited to, metadata of items listed for sale on the e-commerce website, metadata corresponding to a history of items purchased by a customer, and predefined routines. In one or more cases, the data storage repository 108 may be one of, a web server, a mobile computing device, a laptop computer, a tablet computer, a netbook computer, a personal computer (PC), a desktop computer, or any programmable electronic device or computing system capable of receiving, storing, sending data, and performing computer readable program instructions capable of communicating with the server 104, computing devices 110, 112, 114, and 118, via network 106. In one or more cases, the data storage repository 108 may represent virtual instances operating on a computing system utilizing clustered computers and components (e.g., database server computer, application server computers, etc.) that act as a single pool of seamless resources when accessed within data processing environment 100. In one or more cases, the data storage repository 108 may be a remote storage device. In one or more other cases, the data storage repository 108 may be a local storage device on the server 104. For example, the data storage repository 108 may be, but not limited to, a hard drive, non-volatile memory, or a USB stick.

In one or more cases, devices 110, 112, 114, and 118 are clients to the server 104. The devices 110, 112, 114, and 118 may be, for example, a desktop computer, a laptop computer, a tablet computer, a personal digital assistant (PDA), a smart phone, a thin client, a voice assistant device, a digital assistant, or any other electronic device or computing system capable of communicating with server 104 through network 102. For example, device 118 may be a desktop computer capable of connecting to the network 106 to upload an item to the system 102. In another example, the device 112 may be a mobile device capable of connecting to the network 106 and receiving an input to add an item to a customer's online shopping cart on the e-commerce website. In one or more cases, one or more of the devices 110, 112, 114, and 118 may be any suitable type of mobile device capable of running mobile applications, including smart phones, tablets, slate, or any type of device that runs a mobile operating system.

In one or more cases, one or more of the devices 110, 112, 114, and 118 includes a user interface for providing an end user with the capability to interact with the system 102. For example, an end user of the computing device 118 may access the system 102 through the user interface to upload an item to sell on the e-commerce website. A user interface refers to the information (such as graphic, text, and sound) a program presents to a user and the control sequences the user employs to control the program. The user interface can be a graphical user interface (GUI). A GUI may allow users to interact with electronic devices, such as a keyboard and mouse, through graphical icons and visual indicators, such as secondary notations, as opposed to text-based interfaces, typed command labels, or text navigation. For example, the GUI may allow users to view, access, and interact with a website hosted on the server 104.

In one or more cases, one or more of the devices 110, 112, 114, and 118 can be any wearable electronic device, including wearable electronic devices affixed to, for example but not limited to, eyeglasses and sunglasses, helmets, wristwatches, clothing, and the like, and capable of sending, receiving, and processing data. For example, the device 110 may be a wearable electronic device, such as a wristwatch, capable of accessing an e-commerce website and receiving an input to add an item to a customer's cart on the e-commerce website.

Figure 2:
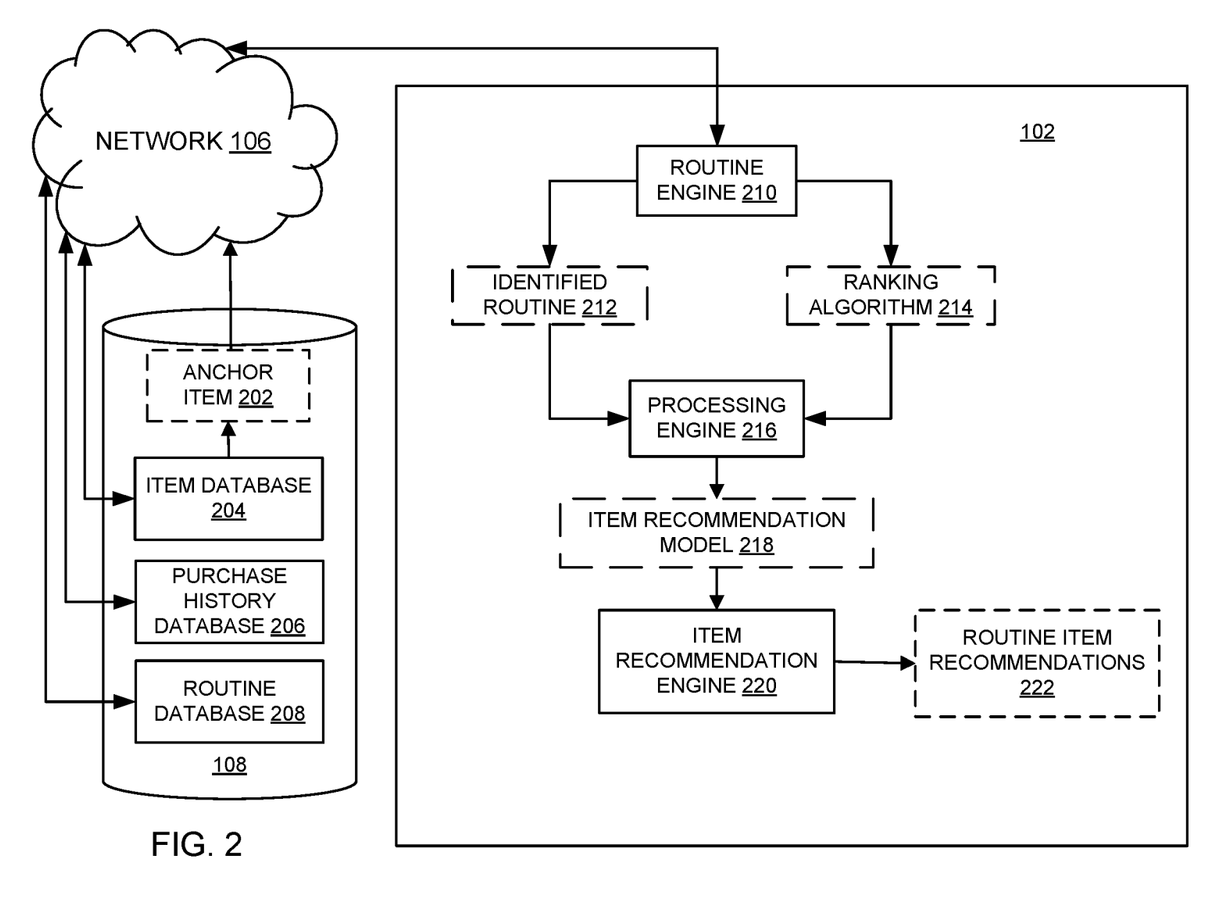
FIG. 2 is a functional block diagram illustrating components of the data processing environment of FIG. 1, in accordance with one or more embodiments.

FIG. 2 is a functional block diagram illustrating components of the data processing environment 100 of FIG. 1.

In one or more cases, the data storage repository 108 includes one or more databases for storing information. For example, the data storage repository 108 may include an item database 204, a purchase history database 206, and a routine database 208. In one or more cases, the item database 204 may store metadata of the items listed for sale. The metadata may include descriptive information of an item, for example, but not limited to, a title of the item, a brand of the item, descriptive phrases of the item, size of the item, color of the item usage instructions for the item, item ingredients, and the like. In one or more cases, the purchase history database 206 may include metadata corresponding to a history of items purchased by a customer, e.g., historical transaction data, and/or history of items viewed by the customer. In one or more cases, metadata of items purchased and/or viewed by the customer may be stored based on the particular customer. In one or more cases, the routine database 208 may store predefined routines for a particular customer and/or for a group of customers. It is noted that FIG. 2 illustrates the item database 204, the purchase history database 206, and the routine database 208 as individual databases localized on the data storage repository 108; however, it should be understood that the data stored within these databases may be stored in collectively on one database, or on more than one database, in which either case the data is stored locally or remotely from the data storage repository 108.

In one or more cases, the system 102 includes a routine engine 210, a processing engine 216, and an item recommendation engine 220. In one or more examples, one or more of the routine engine 210, processing engine 216, and the item recommendation engine 220 may be implemented in hardware. In one or more examples, one or more of the routine engine 210, the processing engine 216, and the item recommendation engine 220 may be implemented as an executable program maintained in a tangible, non-transitory memory, such as instruction memory 807 of FIG. 8, which may be executed by one or processors, such as processor 801 of FIG. 1.

Figure 3:
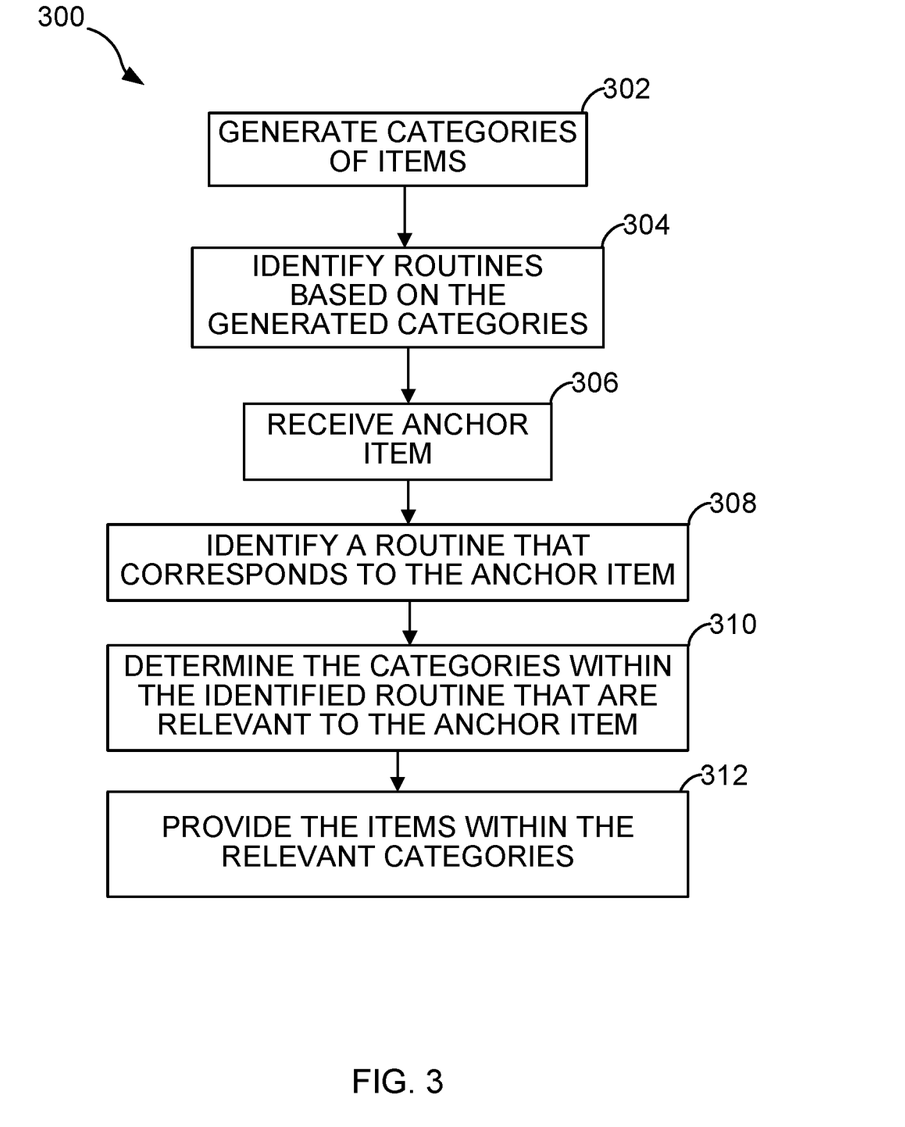
FIG. 3 is a flowchart illustrating a process of providing complementary item recommendations based on customer shopping routines, in accordance with one or more embodiments.

FIG. 3 is a flowchart illustrating a process 300 of providing complementary item recommendations based on customer shopping routines.

It is noted that, while the examples discussed herein are directed to recommending items based on a customer's showering routine, the embodiments discussed herein may be used to recommend items based on any type of routine for any type of product offered for sale, and are not limited to recommending items based on showering routines. Moreover, the embodiments discussed herein may be directed to recommending items for any type of routine for any type of product within any category of the e-commerce website.

Categories of items are generated (302), preferably by the routine engine 210. In one or more cases, the routine engine 210 generates categories of items by retrieving a customer's purchase history data from the purchase history database 206. The customer's purchase history data may include metadata of items purchased by the customer. Based on the customer's purchase history data, in one or more cases, the routine engine 210 may retrieve the descriptive information metadata for the items purchased by the customer from the item database 204. In one or more other cases, the routine engine 210 may extract the descriptive information metadata from the customer's purchase history data. The descriptive information metadata of an item may include, for example, but not limited to, a title of the item, a brand of the item, descriptive phrases of the item, and the like.

Having extracted the descriptive information metadata for the items within the purchase history data, the routine engine 210 may preprocess the descriptive information metadata by applying at least one of a stop words removal algorithm, a tokenization algorithm, a lemmatization algorithm, and the like to the descriptive information metadata. The descriptive information metadata may be predetermined and stored in the item database 204. In one or more cases, for a given item, the category information and the department information may be stored with the item as descriptive information metadata. For example, item 1 may be shampoo with a first brand name, and the corresponding category information may indicate that item 1 corresponds to the shampoo category and the department information may indicate that item 1 corresponds to the health, beauty, and personal care department. The routine engine 210 may aggregate the purchase history data for the customer to the session level. For example, a customer may purchase more than one item within the same order. Before the purchase history data is aggregated, the purchase history data may be organized as, for example, Row1: Customer A purchases item I1 in order D; and Row2: Customer A purchases item I2 in order D. The routine engine 210 may aggregate the purchase history data as, for example, Row1: In order D, Customer A purchases item I1 and I2. Having aggregated the purchase history data, the routine engine 210 applies a word embedding model to the aggregated purchase history data and the preprocessed descriptive information metadata to generate the embeddings. Embeddings are real-valued vectors that can be used to represent the categories of items. Each category may have an embedding. In one or more cases, the word embedding model may be a Word2Vec model or the like. The Word2Vec model may include either a Continuous Bag of Words (CBOW) model or a Skip-Gram model to generate the embedding. The routine engine 210 may group the sets of embeddings together based on at least one of the degree of similarity between categories and the degree to which one category or both categories complement each other.

Routines are identified (304), preferably by the routine engine 210, based on the generated categories. In one or more cases, the routine engine 210 may identify routines by applying a clustering algorithm to the generated categories of items and the respective category embeddings. The clustering algorithm may create a cluster around a group of categories that have complementary behavior. A cluster algorithm may be an unsupervised machine learning approach that divides data points into a number of groups, such that data points in the same groups are more similar to other data points in the same group than those in other groups. Each embedding is a data point in the vector space. In the clustering algorithm, metrics may be defined to evaluate the similarity between embeddings, for example, cosine similarity.

Figure 4:
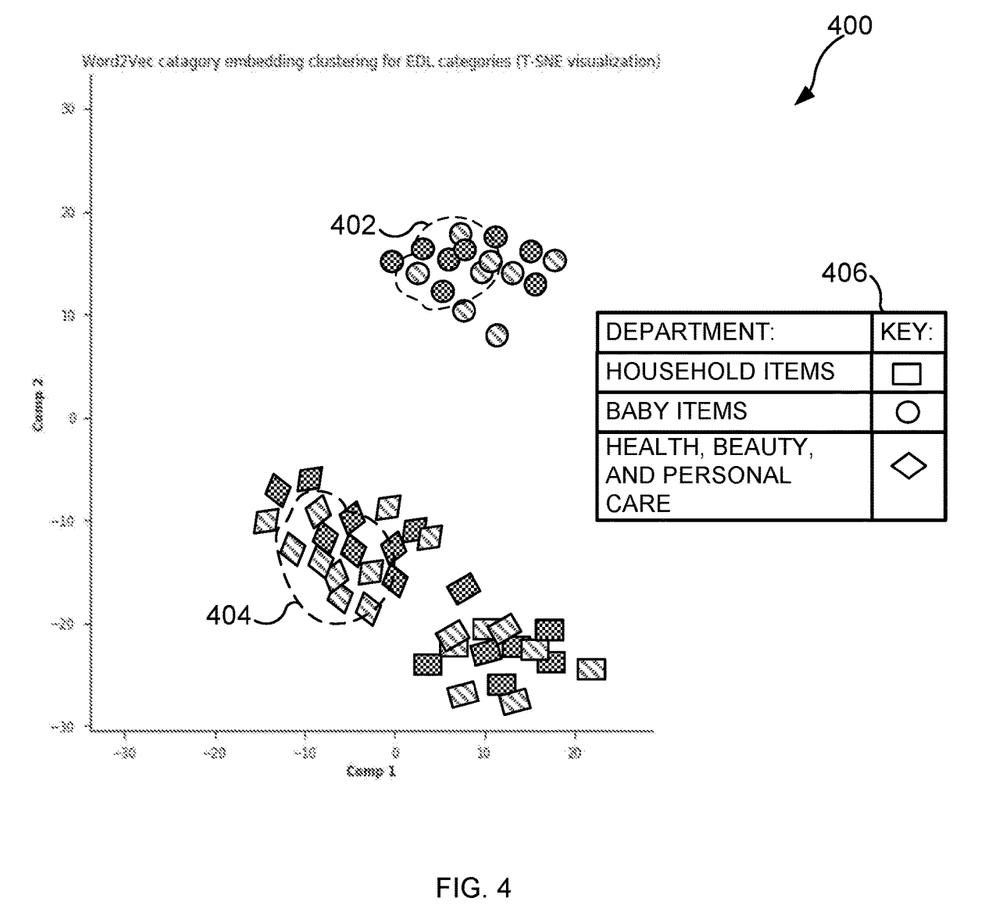
FIG. 4 illustrates an example graph of clusters of categories.

The routine engine 210 may identify each cluster as a routine. For example, FIG. 4 illustrates a graph 400 of clusters, for example clusters 402 and 404, of various categories indicated by the key 406. Each shaped object within the key 406 may refer to a type of department, for example, a square shaped object may refer to a household items department, a circular shaped object may refer to a baby items department, and a diamond shaped object may refer to a health, beauty, and personal care department. In one or more examples, the pattern that fills the shaped objects may indicate different types of categories within the department. For example, a diamond shaped object with a diagonal line fill may represent conditioners and a diamond shaped object with a dotted fill may represent shower gels within the health, beauty, and personal care department. Cluster 402 may be a routine related to, for example, Completing the Essentials for a Toddler's Room, and within this routine, the cluster of categories may include, for example, toddler bedding, toddler beds, toddler décor and accessories, toddler wall décor, toddler seating, and toddler study. Cluster 404 may be a routine related to, for example, Completing your Showering Routine Essentials, and within this routine, the cluster of categories may include, for example, Body Wash, Scalp Scrub, Deodorants and Antiperspirants, Face Wash, Personal Care Sets, Conditioners, Hair Sets, Styling and Treatments, and Shower Gels. In one or more cases, to create a cluster, the routine engine 210 may apply a clustering algorithm, such as, but not limited to, a Spectral Clustering, K-means clustering, hierarchical clustering, and the like, on the category embeddings to algorithmically identify routines.

Figure 5A:
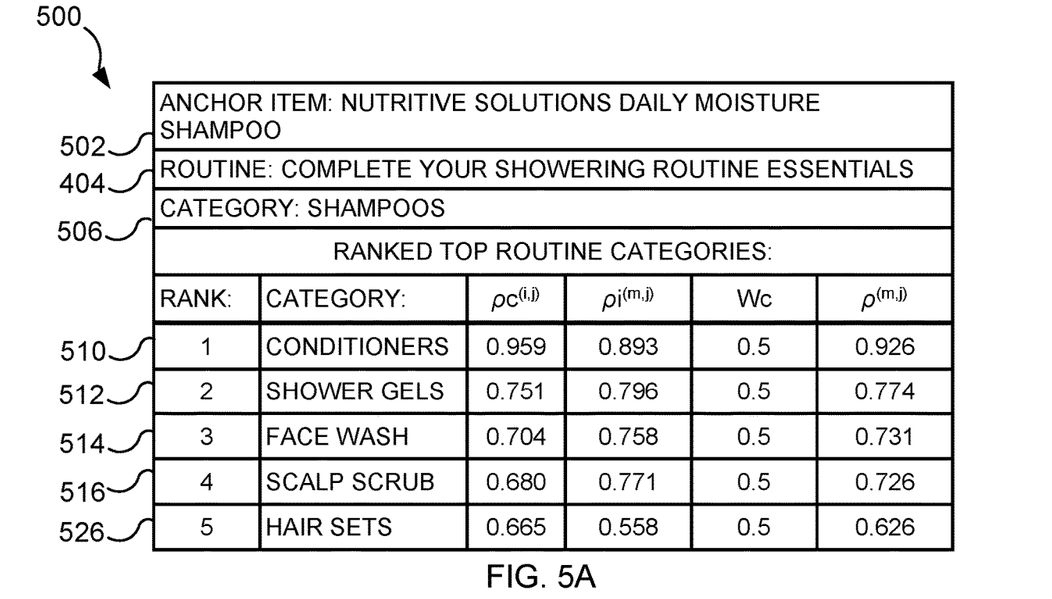
FIG. 5A illustrates example re-ranked routine categories for an example anchor item.

In one or more cases, the routine engine 210 stores the identified routines as predetermined routines in the routine database 208. In one or more cases, one or more lookup tables may be stored in the routine database 208, in which data identifying a category is stored with data that identifies a corresponding routine. For example, data identifying a Shampoo category 506, as shown in FIG. 5A, and data identifying a corresponding Complete your Showering Routine Essentials routine 404 may be stored together within the lookup table. In one or more cases, for the cases in which the routine engine 210 generates categories based on purchase history data for a particular customer, the identified routines may be routines particular to the customer. In one or more other cases, for the cases in which the routine engine 210 generates categories based on purchase history metadata for a group of customers, the identified routines may be generalized routines for that group of customers that shop on the e-commerce website.

An anchor item is received (306), preferably by the system 102. In one or more cases, the system 102 receives the data of the anchor item 202 from the data storage repository 108. For example, the data storage repository 108 may retrieve the data corresponding to the anchor item 202 from the item database 204, and transmit the anchor item data to the routine engine 210 of the system 102, via the network 106. In one or more cases, the system 102 may receive the anchor item 202 in response to a user adding the anchor item to the online shopping cart. For example, in a first example 500, the system 102 may receive a Nutritive Solutions Daily Moisture Shampoo anchor item 502, in response to a user placing the anchor item 502 in the user's online shopping cart. In a second example 501, the system 102 may receive a Cool Wave Men's Antiperspirant and Deodorant anchor item 504.

A routine is identified (308), preferably by the routine engine 210, that corresponds to the anchor item 202. In one or more cases, to identify a routine, the routine engine 210 may retrieve descriptive information metadata for the anchor item 202 from the item database 204 and determine the data of the category that corresponds to the anchor item 202. For example, the routine engine 210 retrieves the descriptive information metadata for the anchor item 502 from the item database 204 and determines that the anchor item 502 belongs to the Shampoos category 506. In another example, the routine engine 210 retrieves the descriptive information metadata for the anchor item 504 from the item database 204 and determines that the anchor item 504 belongs to the Deodorants and Antiperspirants category 508. In one or more cases, the routine engine 210 retrieves the lookup table from the routine database 208 and identifies the routine corresponding to the category. For example, based on the lookup table, the routine engine 210 determines that the Shampoo category 506 corresponds to the Completing your Showering Routine Essentials routine 404. In another example, the routine engine 210 determines that the Deodorants and Antiperspirants category 508 corresponds to the Completing your Showering Routine Essentials routine 404.

Categories within the identified routine 212 that are relevant to the anchor item are determined (310), preferably by the processing engine 216. In one or more cases, to determine the relevant categories with the identified routine, the routine engine 210 provides the identified routine 212 and the anchor item 202 to the processing engine 216. The processing engine 216 applies a ranking algorithm 214 to the anchor item 202 and the categories within the identified routine 212 to determine the relevant categories to the anchor item 202. In one or more cases, the ranking algorithm 214 includes a set of metrics used to output a weighted item-category correlation score, $\rho^{(m,j)}$, for each category within the identified routine 212. The included metrics may be as follows:

$$\rho_c^{(i,j)} = sim(\vec{d}_i, \vec{d}_j) = \sum_k^K t_{i,k} * t_{j,k}; \quad \text{(i)}$$

$$\rho_i^{(m,j)} = \sum_{n: I^{(m,n,j)}=1}^{N} \left(1 - \frac{r(m, n)}{30}\right); \text{ and} \quad \text{(ii)}$$

$$\rho^{(m,j)} = W_c * \rho_c^{(i,j)} + (1 - w_c) * \rho_i^{(m,j)} \quad \text{(iii)}$$

in which i: is an anchor category; j: is a recommendation category within the identified routine 212; m: is an anchor item; n: is a complementary item n for the anchor item m; $\vec{d}_i$: is an embedding vector for category i; $r^{(m,n)}$: is a rank of the complementary item n of the anchor item m; $I^{(m,n,j)}$: 1 if the category of the complementary item n of the anchor item m is j, or 0 if the category of the complementary item n of the anchor item m is not j; $\rho_c^{(i,j)}$: the category-category correlation score for the anchor category i and the routine category j; $\rho_i^{(m,j)}$: is an item-category correlation score for the anchor item m and the routine category j; $\rho^{(m,j)}$: weighted item-category correlation score; and $W_c$: weight of category-category correlation score. In one or more cases, the processing engine 216 ranks the categories, for example, in descending order based on the weighted item-category correlation score.

Figure 5B:
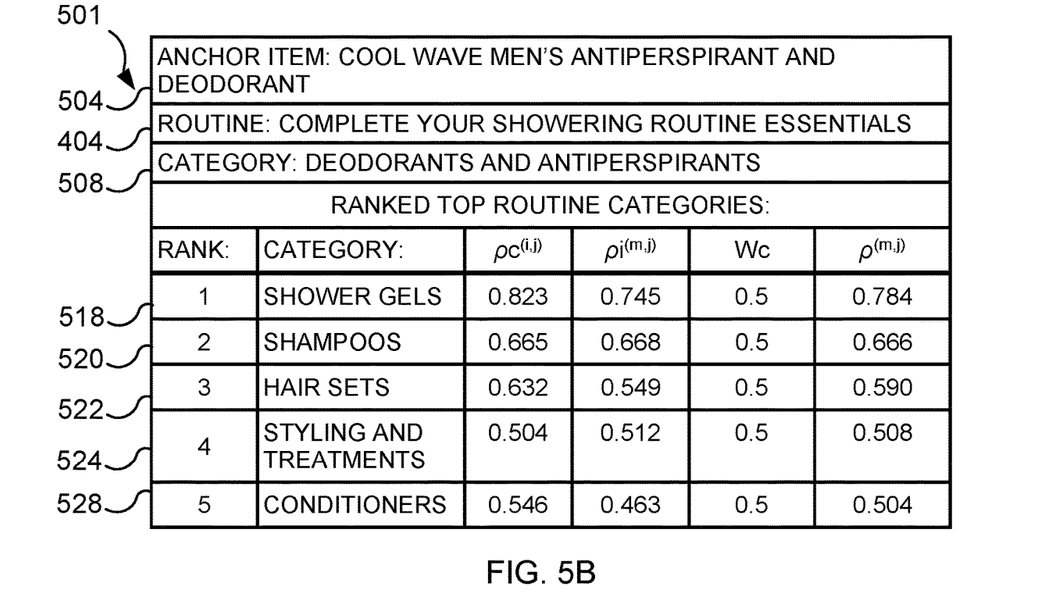
FIG. 5B illustrates example re-ranked routine categories for another example anchor item.

In an example, the processing engine 216 applies the ranking algorithm 214 to the anchor item 502 and the categories within the identified routine 404 to rank the categories in order of relevance to the Nutritive Solutions Daily Moisture Shampoo anchor item 502. The processing engine 216 calculates the category-category correlation score $\rho_c^{(i,j)}$ between the Shampoos anchor category 506 and to the one or more categories within the identified routine 212. In one or more cases, the processing engine 216 may calculate the category-category correlation score $\rho_c^{(i,j)}$ as the cosine similarity of category embeddings. For example, the category-category correlation score $\rho_c^{(i,j)}$ between the Shampoos category 506 and the Conditioners category is 0.959, and the category-category correlation score $\rho_c^{(i,j)}$ between the Shampoos category and the Scalp Scrub category is 0.68. The processing engine 216 may calculate the item-category correlation score $\rho_i^{(m,j)}$. The processing engine 216 obtains the rank $r^{(m,n)}$ from an existing item level item-item co-purchase model. In the existing item level item-item co-purchase model, given the anchor item m, a list of item recommendations, such as complementary item n, are provided that are complementary to anchor item m. Based on the item level item-item co-purchase model, the processing engine 216 identifies the category information for item n and calculates the item-category correlation score $\rho_i^{(m,j)}$. For example, the processing engine 216 calculates an item-category correlation score $\rho_i^{(m,j)}$ of 0.893 for the Nutritive Solutions Daily Moisture Shampoo anchor item 502 and the Conditioners category 510, and an item-category correlation score $\rho_i^{(m,j)}$ of 0.758 for the Nutritive Solutions Daily Moisture Shampoo anchor item 502 and the Face Wash category 514. The processing engine 216 calculates the weighted item-category correlation score $\rho^{(m,j)}$ for each categories and ranks the category based on the weighted item-category correlation score $\rho^{(m,j)}$. In one or more cases, the processing engine 216 may rank the categories from the highest weighted item-category correlation score to the lowest weighted item-category correlation score. For example, based on the weighted item-category correlation scores, the processing engine 216 ranks the Conditioners category 510 first, the Shower Gels category 512 second, the Face Wash category 514 third, the Scalp Scrub category 516 fourth, and the Hair Sets category 526 fifth. In another instance, the processing engine 216 applies the ranking algorithm 214 to the anchor item 504 and the categories within the identified routine 404, and ranks the categories in order of relevance to the Cool Wave Men's Antiperspirant and Deodorant anchor item 504. For example, based on the weighted item category correlation scores, the processing engine 216 ranks the Shower Gels category 518 first, the Shampoos category 520 second, the Hair Sets category 522 third, the Styling and Treatments category 524 fourth, and the Conditioners category 528 fifth.

Figure 6:
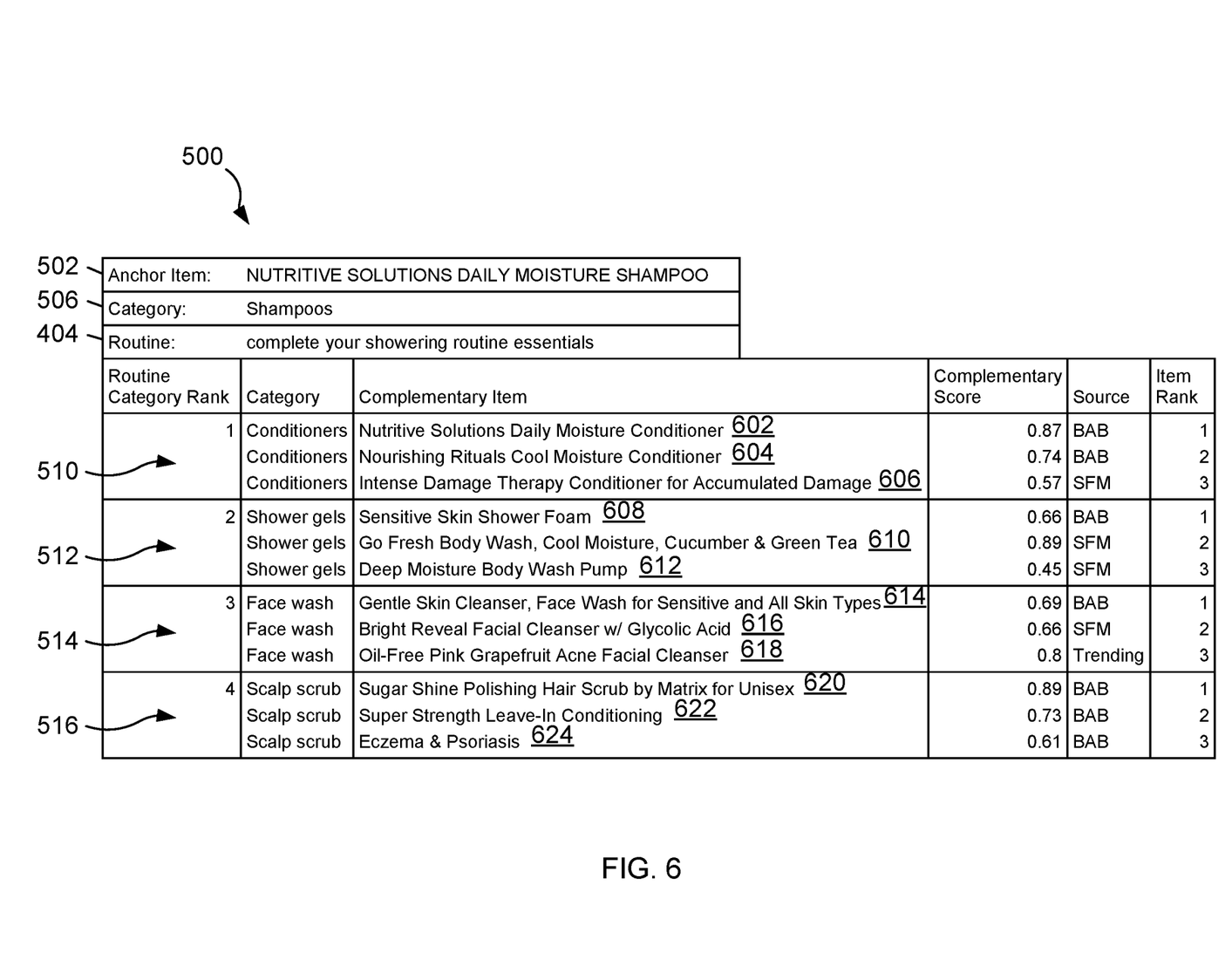
FIG. 6 illustrates example relevant items of the example re-ranked routine categories.

Items within the relevant categories are provided (312), preferably by the item recommendation engine 220. In one or more cases, the item recommendation engine 220 may apply an item recommendation model 218 to the data of items within the relevant categories of the identified routine 212. The item recommendation model 218 may utilize at least one of an item-to-item co-purchase model and a category trending model, such as a bought-also-bought model, a shop for model, and a trending model. The bought-also-bought model (BAB) and shop for model (SFM) may be item level complementary recommendation models. In one or more cases, the BAB model may be developed with customer historical transaction data. In one or more cases, the SFM model may be developed with customer historical transaction and customer view data. In one or more cases, a trending model may be developed with customer historical transaction data to identify trending items for a given category. In one or more cases, the item recommendation model 218 may output complementary scores for the one or more items within a relevant category. For example, for the Conditioners category 510 with respect to the first example 500, the item recommendation model 218 may output a complementary score of 0.87, via the BAB model, for the Nutritive Solutions Daily Moisture Conditioner item 602; a complementary score of 0.74, via the BAB model, for the Nourishing Rituals Cool Moisture Conditioner item 604; and a complementary score of 0.57, via the SFM model, for the Intense Damage Therapy Conditioner for Accumulated Damage item 606. In one or more cases, the item recommendation engine 216 may apply the BAB model to a customer historical transaction data for the complementary item. For the cases in which the item recommendation engine 216 does not have enough customer historical transaction data for the complementary item to apply the BAB model, the item recommendation engine 216 may apply the SFM model to the customer historical transaction and customer view data of the complementary item. For the cases in which the item recommendation engine 216 does not have enough customer historical transaction data and customer view data for the complementary items within the category to apply the BAB model or the SFM model, the item recommendation engine 216 may apply the trending model to the customer historical transaction data.

Figure 7:
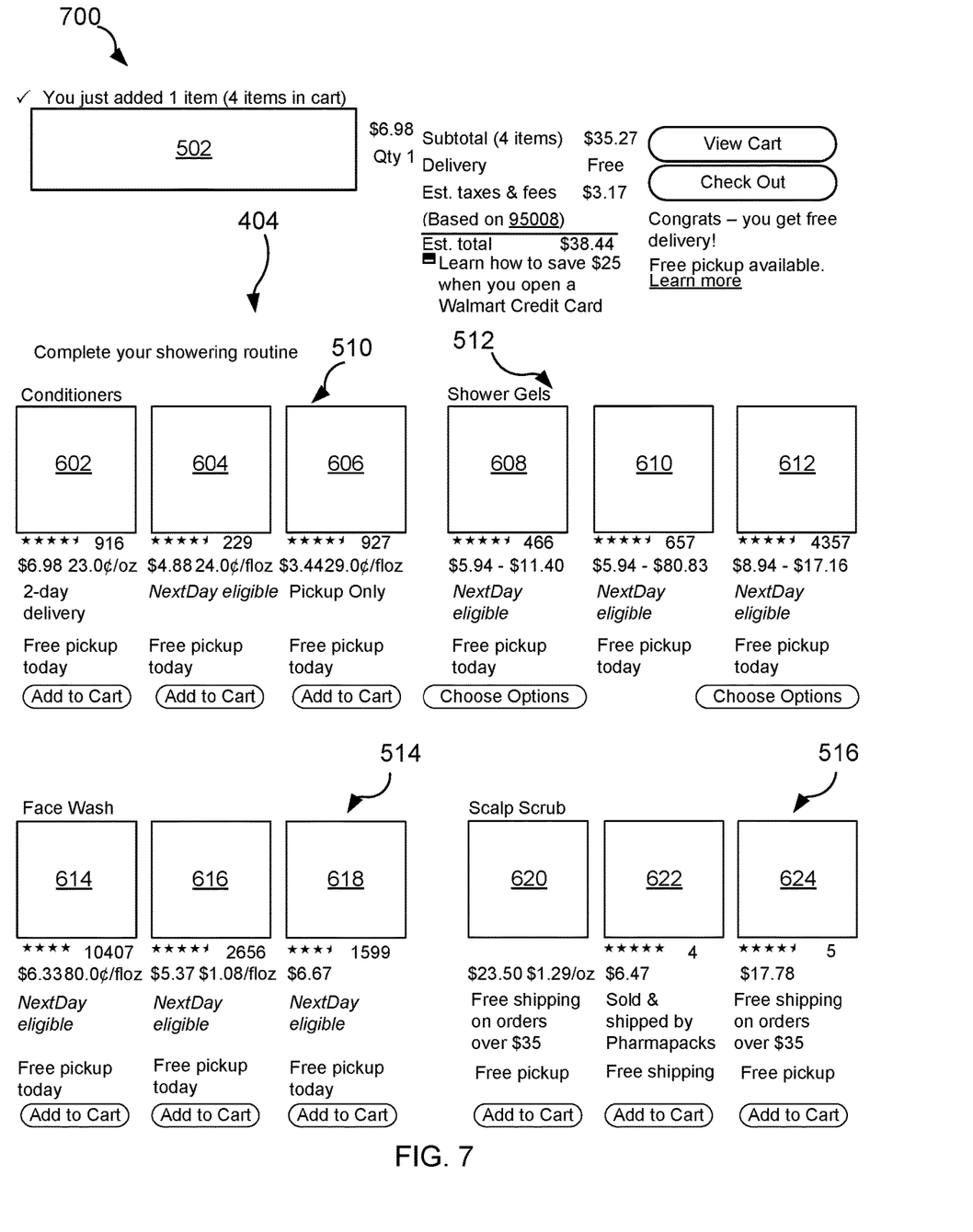
FIG. 7 is an example view of a web page displaying an example routine recommendation.

The item recommendation engine 220 may rank the items within a relevant category in order of relevance to the anchor item 202. For example, the item recommendation engine 220 may rank the Nutritive Solutions Daily Moisture Conditioner item 602 first, the Nourishing Rituals Cool Moisture Conditioner item 604 second, and the Intense Damage Therapy Conditioner for Accumulated Damage item 606 for the Conditioners category 510. The item recommendation engine 220 may repeat this ranking process for each of the remaining relevant categories, such as the Shower Gels category 512, the Face Wash category 514, and the Scalp Scrub category 516. Having ranked the items within the relevant categories, the item recommendation engine 220 aggregates the ranked items and relevant categories into a routine item recommendation 222. The item recommendation engine 220 may provide the routine item recommendation 222 to, for example, an add-to-cart page 700 of the e-commerce website, as shown in FIG. 7. Accordingly, the computing device, such as computing device 114, may display the routine item recommendation 222 on the add-to-cart page 700 to a customer. In one or more cases, the computing device 114 may display the complementary items within routine item recommendation 222 in order of relevance per category. For example, the computing device 114 may display the Nutritive Solutions Daily Moisture Conditioner item 602 first, the Nourishing Rituals Cool Moisture Conditioner item 604 second, and the Intense Damage Therapy Conditioner for Accumulated Damage item 606 within the Conditioners category 510. The computing device item 114 may display the complementary items in a similar fashion for each of the remaining relevant categories, such as the Shower Gels category 512, the Face Wash category 514, and the Scalp Scrub category 516.

In one or more cases, the system 102 may employ a shopping cart auto-detection feature to remove redundant items that are placed in the customer's online shopping cart. For example, the system 102 may detect that the customer added a conditioner to the online shopping cart. The system 102 may detect that the customer added shampoo, e.g., anchor item 502, to the online cart and may identify the routine as being the Completing your Showering Routine essentials routine 404. In response to identifying the anchor item 502, the routine 404, and the condition already within the online shopping cart, the system 102 removes the Conditioners category 510 to avoid recommending that the customer purchase a conditioner. The system 102 may recommend another relevant category to replace the removed category, and may rank the relevant categories and item therein as described in the present disclosure.

In one or more cases, the system 102 may utilize time sensitive predictions to provide routine item recommendations 222. For example, the system 102 may determine a replenishment cycle time period for which a customer purchases a same or similar item. In one or more cases, the system 102 determines a replenishment cycle time period based on, for example, the average time between purchases of the same or similar item. For example, the system 102 may determine that the customer purchases conditioner every two months, and therefore, may determine that the replenishment cycle time period for conditioner for this customer is about every two months. In one or more other cases, the system 102 determines a replenishment cycle time period based on a predetermined time period. The predetermined time period may be determined based on the average time that customers repurchase the item. For example, the system 102 may determine the average time that customers repurchase face wash items is about every 12 weeks. For the cases in which a customer places an anchor item in the online shopping cart, the system 102 determines if the customer is shopping around the time of the replenishment cycle time period. If the customer is not shopping at the replenishment cycle time period, the system 102 may remove the recommended item or relevant category from the routine item recommendation 222. If the customer is shopping around the time of the replenishment cycle time period, the system 102 may increase the relevancy score of the replenishment cycle item and/or may add more weight to the weighted item category correlation score of the relevant category to increase the ranking of the item and/or relevant category.

In one or more cases, the system 102 may prioritize items within the routine item recommendation 222. The prioritized items may be items that a customer has previously purchased, items within a brand that the customer usually purchases, and/or items based on the customer's persona. Items based on a customer's persona may be based on the habits of the customer. For example, the system 102 may determine that the customer belongs to the persona 'busy family', and may recommend items that are popular among customers in this persona. To prioritize items, the system 102 may increase the relevancy score of the prioritized item and/or may increase the weighted item category correlation score of the relevant category. Accordingly, the system 102 may increase the ranking of the item and/or relevant category.

Figure 8:
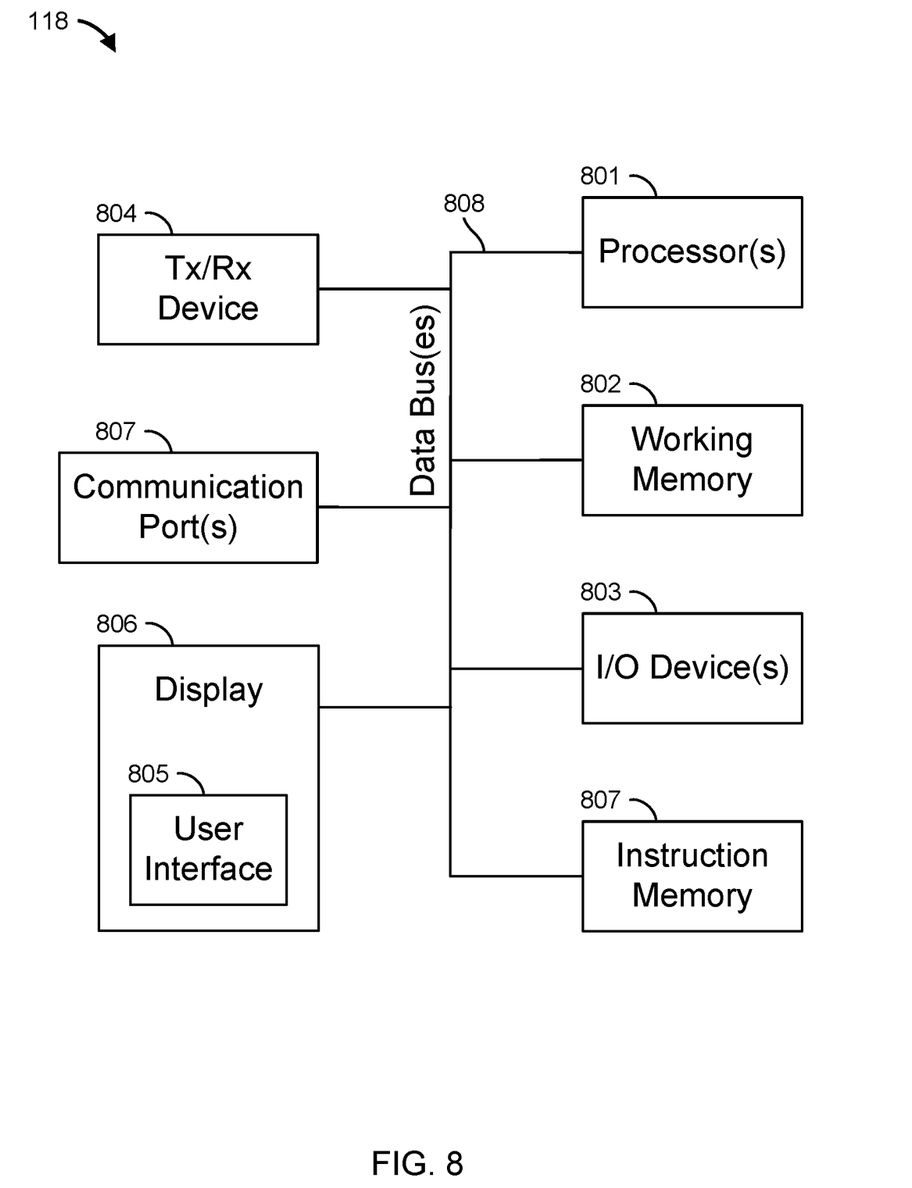
FIG. 8 depicts a block diagram of components of a computing device capable of performing the processes described herein, in accordance with one or more embodiments.

FIG. 8 depicts a block diagram of components of a computing device capable of performing the processes described herein. In particular, FIG. 8 illustrates an example computing device, such as computing device 118, capable of interacting with the system 102 of FIG. 1.

Computing device 118 can include one or more processors 801, working memory 802, one or more input/output devices 803, instruction memory 807, a transceiver 804, one or more communication ports 809, and a display 806, all operatively coupled to one or more data buses 808. Data buses 808 allow for communication among the various devices. Data buses 808 can include wired, or wireless, communication channels.

Processors 801 can include one or more distinct processors, each having one or more cores. Each of the distinct processors can have the same or different structure. Processors 801 can include one or more central processing units (CPUs), one or more graphics processing units (GPUs), application specific integrated circuits (ASICs), digital signal processors (DSPs), and the like.

Processors 801 can be configured to perform a certain function or operation by executing code, stored on instruction memory 807, embodying the function or operation. For example, processors 801 can be configured to perform one or more of any function, method, or operation disclosed herein.

Instruction memory 807 can store instructions that can be accessed (e.g., read) and executed by processors 801. For example, instruction memory 807 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 801 can store data to, and read data from, working memory 802. For example, processors 801 can store a working set of instructions to working memory 802, such as instructions loaded from instruction memory 807. Processors 801 can also use working memory 802 to store dynamic data created during the operation of system 102. Working memory 802 can be a random access memory (RAM) such as a static random access memory (SRAM) or dynamic random access memory (DRAM), or any other suitable memory.

Input-output devices 803 can include any suitable device that allows for data input or output. For example, input-output devices 803 can include one or more of a keyboard, a touchpad, a mouse, a stylus, a touchscreen, a physical button, a speaker, a microphone, or any other suitable input or output device.

Communication port(s) 809 can include, for example, a serial port such as a universal asynchronous receiver/transmitter (UART) connection, a Universal Serial Bus (USB) connection, or any other suitable communication port or connection. In some examples, communication port(s) 809 allows for the programming of executable instructions in instruction memory 807. In some examples, communication port(s) 809 allow for the transfer (e.g., uploading or downloading) of data, such as transaction data.

Display 806 can display user interface 805. User interfaces 805 can enable user interaction with, for example, computing device 112 or 118. For example, user interface 805 can be a user interface for an application of a retailer that allows a customer to purchase one or more items from the retailer. In some examples, a user can interact with user interface 805 by engaging input-output devices 803. In some examples, display 806 can be a touchscreen, in which the touchscreen displays the user interface 805.

Transceiver 804 allows for communication with a network, such as the communication network 118 of FIG. 1. For example, if network 106 of FIG. 1 is a cellular network, transceiver 804 is configured to allow communications with the cellular network. In some examples, transceiver 804 is selected based on the type of network 106 system 102 will be operating in. Processor(s) 801 is operable to receive data from, or send data to, a network, such as network 106 of FIG. 1, via transceiver 804.

Although the embodiments discussed herein are described with reference to the figures, it will be appreciated that many other ways of performing the acts associated with the embodiments can be used. For example, the order of some operations may be changed, and some of the operations described may be optional.

In addition, the embodiments described herein can be at least partially implemented in the form of computer-implemented processes and apparatus. The disclosed embodiments may also be at least partially implemented in the form of tangible, non-transitory machine-readable storage media encoded with computer program code. For example, the processes described herein can be implemented in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the embodiments. The embodiments may also be at least partially implemented in the form of a computer into which computer program code is loaded or executed, such that, the computer becomes a special purpose computer for practicing the embodiments. When implemented on a general-purpose processor, the computer program code segments configure the processor to create specific logic circuits. The embodiments may alternatively be at least partially implemented in application specific integrated circuits for performing the embodiments.

The foregoing is provided for purposes of illustrating, explaining, and describing embodiments of this disclosure. Modifications and adaptations to the embodiments will be apparent to those skilled in the art and may be made without departing from the scope or spirit of the disclosure.

What is claimed is:

1. A system comprising:
   a plurality of computing devices, each device of the plurality of computing devices being associated with a customer of a plurality of customers associated with a website;
   a server configured to host the website; and
   a memory having instructions stored thereon, and a processor configured to read the instructions to:
      for each customer of the plurality of customers:
         receive, from a corresponding computing device of the plurality of computing devices, anchor item data of an anchor item, the anchor item data including descriptive information metadata;

determine categorical data of a category of a plurality of categories that corresponds to the anchor item;
identify a routine of a plurality of predetermined routines that corresponds to the categorical data of the anchor item, each routine of the plurality of predetermined routines being (i) based on an item purchasing behavior of the corresponding customer of the plurality of customers associated with the website and (ii) associated with a set of categorical data indicating a group of categories that are associated with the corresponding routine;
generate relevant categorical data within the identified routine by applying a ranking algorithm to the categorical data of the identified routine and the categorical data of the anchor item, the relevant categorical data indicating one or more categories that are associated with the identified routine and are relevant to the anchor item, the one or more categories being associated with one or more relevant items;
generate relevant item data from the relevant categorical data by applying an item recommendation model to item data that corresponds to the relevant categorical data;
based on the relevant item data, generate, for each of the one or more relevant items, a graphical representation and a selectable feature, the selectable feature, when triggered, implements a set of operations that add the corresponding relevant item of the one or more relevant items to an online shopping cart associated with the website and the corresponding customer, along with the anchor item.

2. The system of claim 1, wherein the anchor item data corresponds to an item placed in an online shopping cart.

3. The system of claim 1, wherein identifying the routine of the plurality of predetermined routines includes:
applying a word embedding model to purchase history data and descriptive information data of items purchased by a customer to generate sets of embeddings; and
grouping the sets of embeddings together to generate categories of items.

4. The system of claim 3, wherein the processor is further configured to read the instructions to store the determined routine as a predetermined routine.

5. The system of claim 1, wherein the processor is further configured to read the instructions to apply the ranking algorithm to generate a category correlation score for each category of the plurality of categories, and rank the plurality of categories based on the category correlation score for each category of the plurality of categories.

6. The system of claim 1, wherein the item recommendation model comprises at least one of an item-to-item co-purchase model and a category trending model.

7. The system of claim 1, wherein the processor is further configured to read the instructions to apply the item recommendation model to output complementary scores for items corresponding to the item data that corresponds to the relevant categorical data, and to rank the items within the one or more categories of the relevant categorical data based on relevancy to the anchor item that corresponds to the anchor item data.

8. A computer-implemented method comprising:
for each customer of a plurality of customers associated with a website:
receiving, by a processor and from a corresponding computing device of the customer, anchor item data of an anchor item, the anchor item data including descriptive information metadata;
determine, by the processor, categorical data of a category of a plurality of categories that corresponds to the anchor item;
identifying, by the processor, a routine of a plurality of predetermined routines that corresponds to the categorical data of the anchor item, each routine of the plurality of predetermined routines being (i) based on an item purchasing behavior of the corresponding customer of the plurality of customers associated with the website and (ii) associated with a set of categorical data indicating a group of categories that are associated with the corresponding routine;
generating, by the processor, relevant categorical data within the identified routine by applying a ranking algorithm to the categorical data of the identified routine and the categorical data of the anchor item, the relevant categorical data indicating one or more categories that are associated with the identified routine and are relevant to the anchor item, the one or more categories being associated with one or more relevant items;
generating, by the processor, relevant item data from the relevant categorical data by applying an item recommendation model to item data that corresponds to the relevant categorical data; and
based on the relevant item data, generating, by the processor and for each of the one or more relevant items, a graphical representation and a selectable feature, the selectable feature, when triggered, implements a set of operations that add the corresponding relevant item of the one or more relevant items to an online shopping cart associated with the website and the corresponding customer, along with the anchor item.

9. The method of claim 8, wherein the anchor item data corresponds to an item placed in an online shopping cart.

10. The computer-implemented method of claim 8, wherein identifying the routine of the plurality of predetermined routines includes:
applying a word embedding model to purchase history data and descriptive information data of items purchased by a customer to generate sets of embeddings; and
grouping the sets of embeddings together to generate categories of items.

11. The computer-implemented method of claim 10, further comprising storing the determined routine as a predetermined routine.

12. The computer-implemented method of claim 8, further comprising:
applying the ranking algorithm to generate a category correlation score for each category of the plurality of categories; and
ranking the plurality of categories based on the category correlation score for each category of the plurality of categories.

13. The computer-implemented method of claim 8, further comprising:
applying the item recommendation model to output complementary scores for items corresponding to the item data; and
ranking the items within a category based on relevancy to the anchor item that corresponds to the anchor item data.

14. A computer program product comprising:
a non-transitory computer readable medium having program instructions stored thereon, the program instructions executable by one or more processors, the program instructions comprising:
for each customer of a plurality of customers associated with a website:
receiving, from a corresponding computing device of the customer, anchor item data of an anchor item, the anchor item data including descriptive information metadata;
determining categorical data of a category of a plurality of categories that corresponds to the anchor item;
identifying a routine of a plurality of predetermined routines that corresponds to the categorical data of the anchor item, each routine of the plurality of predetermined routines being (i) based on an item purchasing behavior of the corresponding customer of the plurality of customers associated with the website and (ii) associated with a set of categorical data indicating a group of categories that are associated with the corresponding routine;
generating relevant categorical data within the identified routine by applying a ranking algorithm to the categorical data of the identified routine and the categorical data of the anchor item, the relevant categorical data indicating one or more categories that are associated with the identified routine and are relevant to the anchor item, the one or more categories being associated with one or more relevant items;
generating relevant item data from the relevant categorical data by applying an item recommendation model to item data that corresponds to the relevant categorical data; and
based on the relevant item data, generating, by the processor and for each of the one or more relevant items, a graphical representation and a selectable feature, the selectable feature, when triggered, implements a set of operations that add the corresponding relevant item of the one or more relevant items to an online shopping cart associated with the website and the corresponding customer, along with the anchor item.

15. The computer program product of claim 14, wherein the program instructions further comprise:
applying a word embedding model to purchase history data and descriptive information data of items purchased by a customer to generate sets of embeddings;
grouping the sets of embeddings together to generate categories of items; and
for each cluster of a group of categories that have a complementary behavior, determine a routine.

16. The computer program product of claim 14, wherein the program instructions further comprise:
applying the item recommendation model to output complementary scores for items corresponding to the item data; and
ranking the items within the category based on relevancy to the anchor item that corresponds to the anchor item data.

* * * * *